United States Patent
Kimura et al.

(10) Patent No.: US 12,085,904 B2
(45) Date of Patent: Sep. 10, 2024

(54) ENGINEERING DEVICE, ENGINEERING METHOD, AND INFORMATION STORAGE MEDIUM

(71) Applicant: Kabushiki Kaisha Yaskawa Denki, Kitakyushu (JP)

(72) Inventors: Hajime Kimura, Kitakyushu (JP); Seishiro Sakaguchi, Kitakyushu (JP); Hiromasa Shimizu, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 95 days.

(21) Appl. No.: 17/359,663

(22) Filed: Jun. 28, 2021

(65) Prior Publication Data

US 2021/0405597 A1    Dec. 30, 2021

(30) Foreign Application Priority Data

Jun. 30, 2020  (JP) ................. 2020-113004

(51) Int. Cl.
  *G05B 19/05*    (2006.01)
  *G05B 15/02*    (2006.01)

(52) U.S. Cl.
  CPC .......... *G05B 15/02* (2013.01); *G05B 19/056* (2013.01); *G05B 2219/31094* (2013.01)

(58) Field of Classification Search
  USPC ........................................... 700/28
  See application file for complete search history.

(56) References Cited

U.S. PATENT DOCUMENTS

| 6,952,811 | B1* | 10/2005 | Iwata .................. G05B 19/056 |
| | | | 716/139 |
| 2008/0189536 | A1* | 8/2008 | Mann ...................... G06F 8/34 |
| | | | 713/1 |
| 2015/0032936 | A1 | 1/2015 | Yu et al. |
| 2015/0039861 | A1 | 2/2015 | Rong et al. |
| 2018/0210414 | A1* | 7/2018 | Ino .................... G05B 19/0426 |
| 2020/0125060 | A1* | 4/2020 | Fujimura ............. G05B 19/056 |

FOREIGN PATENT DOCUMENTS

| CN | 104412233 A | 3/2015 |
| JP | H11249715 A | 9/1999 |
| JP | 2001-022413 A | 1/2001 |

(Continued)

OTHER PUBLICATIONS

EZAutomation, "EZPLC Software Manual" Manual Part No. EZPLC-EDIT-M, 2006, 189 pages (Year: 2006).*

(Continued)

*Primary Examiner* — Emilio J Saavedra
(74) *Attorney, Agent, or Firm* — HEA LAW PLLC

(57) ABSTRACT

An engineering device, which is configured to set a higher-level control device capable of controlling a control device for one or more industrial machines, the engineering device including circuitry configured to: receive specification of a register number of the higher-level control device; determine, based on the specified register number, a register range to be used for control of the control device by the higher-level control device; and allocate the determined register range among registers of the higher-level control device, for the control of the control device.

15 Claims, 13 Drawing Sheets

(56) References Cited

FOREIGN PATENT DOCUMENTS

| | | | |
|---|---|---|---|
| JP | 2012194678 A | 10/2012 |
| JP | 2013097460 A | 5/2013 |
| JP | 2016-105330 A | 6/2016 |
| JP | 2017027259 A | 2/2017 |
| JP | 2020013527 A | 1/2020 |

OTHER PUBLICATIONS

Search Report of Dec. 1, 2021, for corresponding EP Patent Application No. 21180828.2 pp. 1-7.
Office Action of Apr. 19, 2022, for corresponding JP Patent Application No. 2020-113004 with partial English translation pp. 1-3.
Office Action of Oct. 31, 2023, for corresponding CN Patent Application No. 202110723414.7 with English translation, pp. 1-18.

* cited by examiner

FIG.2

| No | SYSTEM CONFIGURATION | TRANSMISSION TYPE | START REGISTER NUMBER | END REGISTER NUMBER | WATCHDOG TIMER SETTING(ms) | COMMENT |
|----|----------------------|-------------------|------------------------|----------------------|-----------------------------|---------|
| 1  | UNUSED               |                   |                        |                      | 1000                        |         |
| 2  | UNUSED               |                   |                        |                      | 1000                        |         |
| 3  | UNUSED               |                   |                        |                      | 1000                        |         |
| 4  | UNUSED               |                   |                        |                      | 1000                        |         |
| 5  | UNUSED               |                   |                        |                      | 1000                        |         |
| 6  | UNUSED               |                   |                        |                      | 1000                        |         |
| 7  | UNUSED               |                   |                        |                      | 1000                        |         |
| 8  | UNUSED               |                   |                        |                      | 1000                        |         |

DETAILED DEFINITION
FILE
SETTING/STATUS

| No | SYSTEM CONFIGURATION | TRANSMISSION TYPE | START REGISTER NUMBER | END REGISTER NUMBER | WATCHDOG TIMER SETTING(ms) | COMMENT |
|---|---|---|---|---|---|---|
| 1 | UNUSED ▼ | | | | 1000 | |
| 2 | UNUSED | | | | 1000 | |
| 3 | A CONNECTION1 | | | | 1000 | |
| 4 | A CONNECTION2 | | | | 1000 | |
| 5 | A CONNECTION3 | | | | 1000 | |
| 6 | B CONNECTION1 | | | | 1000 | |
| 7 | B CONNECTION2 | | | | 1000 | |
| 8 | B CONNECTION3 | | | | 1000 | |
|   | B CONNECTION4 | | | | | |

DETAILED DEFINITION — FILE — SETTING/STATUS

| No | SYSTEM CONFIGURATION | TRANSMISSION TYPE | START REGISTER NUMBER | END REGISTER NUMBER | WATCHDOG TIMER SETTING(ms) | COMMENT |
|---|---|---|---|---|---|---|
| 1 | B CONNECTION1 | TRANSMISSION TYPE X | | | 100 | |

| CONNECTION NUMBER | OWN STATION PORT | ROBOT CONTROLLER IP ADDRESS | ROBOT CONTROLLER PORT | CONNECTION TYPE | PROTOCOL TYPE | CODE |
|---|---|---|---|---|---|---|
| 1 | | | 502 | CONNECTION1 | PROTOCOL1 | BIN |

~F10

| 2 | UNUSED | | | | 1000 | |
| 3 | UNUSED | | | | 1000 | |
| 4 | UNUSED | | | | 1000 | |
| 5 | UNUSED | | | | 1000 | |
| 6 | UNUSED | | | | 1000 | |
| 7 | UNUSED | | | | 1000 | |
| 8 | UNUSED | | | | 1000 | |

G1

DETAILED DEFINITION
FILE
SETTING/STATUS

FIG.5

| No | SYSTEM CONFIGURATION | TRANSMISSION TYPE | START REGISTER NUMBER | END REGISTER NUMBER | WATCHDOG TIMER SETTING(ms) | COMMENT |
|---|---|---|---|---|---|---|
| 1 | B CONNECTION1 | TRANSMISSION TYPE X | GW00000 | GW04259 | 100 | |

| CONNECTION NUMBER | OWN STATION PORT | ROBOT CONTROLLER IP ADDRESS | ROBOT CONTROLLER PORT | CONNECTION TYPE | PROTOCOL TYPE | CODE |
|---|---|---|---|---|---|---|
| 1 | 5000 | 192.168.1.100 | 502 | CONNECTION1 | PROTOCOL1 | BIN |

| 2 | UNUSED | | | | 1000 | |
| 3 | UNUSED | | | | 1000 | |
| 4 | UNUSED | | | | 1000 | |
| 5 | UNUSED | | | | 1000 | |
| 6 | UNUSED | | | | 1000 | |
| 7 | UNUSED | | | | 1000 | |
| 8 | UNUSED | | | | 1000 | |

G1 — DETAILED DEFINITION window (FILE / SETTING/STATUS), F10

FIG.6

| No | SYSTEM CONFIGURATION | TRANSMISSION TYPE | START REGISTER NUMBER | END REGISTER NUMBER | WATCHDOG TIMER SETTING(ms) | COMMENT |
|---|---|---|---|---|---|---|
| 1 | B CONNECTION1 | TRANSMISSION TYPE X | GW00000 | GW04259 | 100 | |

| CONNECTION NUMBER | OWN STATION PORT | ROBOT CONTROLLER IP ADDRESS | ROBOT CONTROLLER PORT | CONNECTION TYPE | PROTOCOL TYPE | CODE | |
|---|---|---|---|---|---|---|---|
| 1 | 5000 | 192.168.1.100 | 502 | CONNECTION1 | PROTOCOL1 | BIN | F10 |

| 2 | B CONNECTION2 | TRANSMISSION TYPE X | GW05000 | GW09259 | 100 | |

| CONNECTION NUMBER | OWN STATION PORT | ROBOT CONTROLLER IP ADDRESS | ROBOT CONTROLLER PORT | CONNECTION TYPE | PROTOCOL TYPE | CODE | |
|---|---|---|---|---|---|---|---|
| 2 | 5001 | 192.168.1.101 | 502 | CONNECTION1 | PROTOCOL1 | BIN | F11 |

| 3 | B CONNECTION3 | TRANSMISSION TYPE X | GW10000 | GW14259 | 100 | |

| CONNECTION NUMBER | OWN STATION PORT | ROBOT CONTROLLER IP ADDRESS | ROBOT CONTROLLER PORT | CONNECTION TYPE | PROTOCOL TYPE | CODE | |
|---|---|---|---|---|---|---|---|
| 3 | 5002 | 192.168.1.102 | 502 | CONNECTION1 | PROTOCOL1 | BIN | F12 |

| 4 | UNUSED | | | | 1000 | |
| 5 | UNUSED | | | | 1000 | |
| 6 | UNUSED | | | | 1000 | |

DETAILED DEFINITION — G1
FILE / SETTING/STATUS

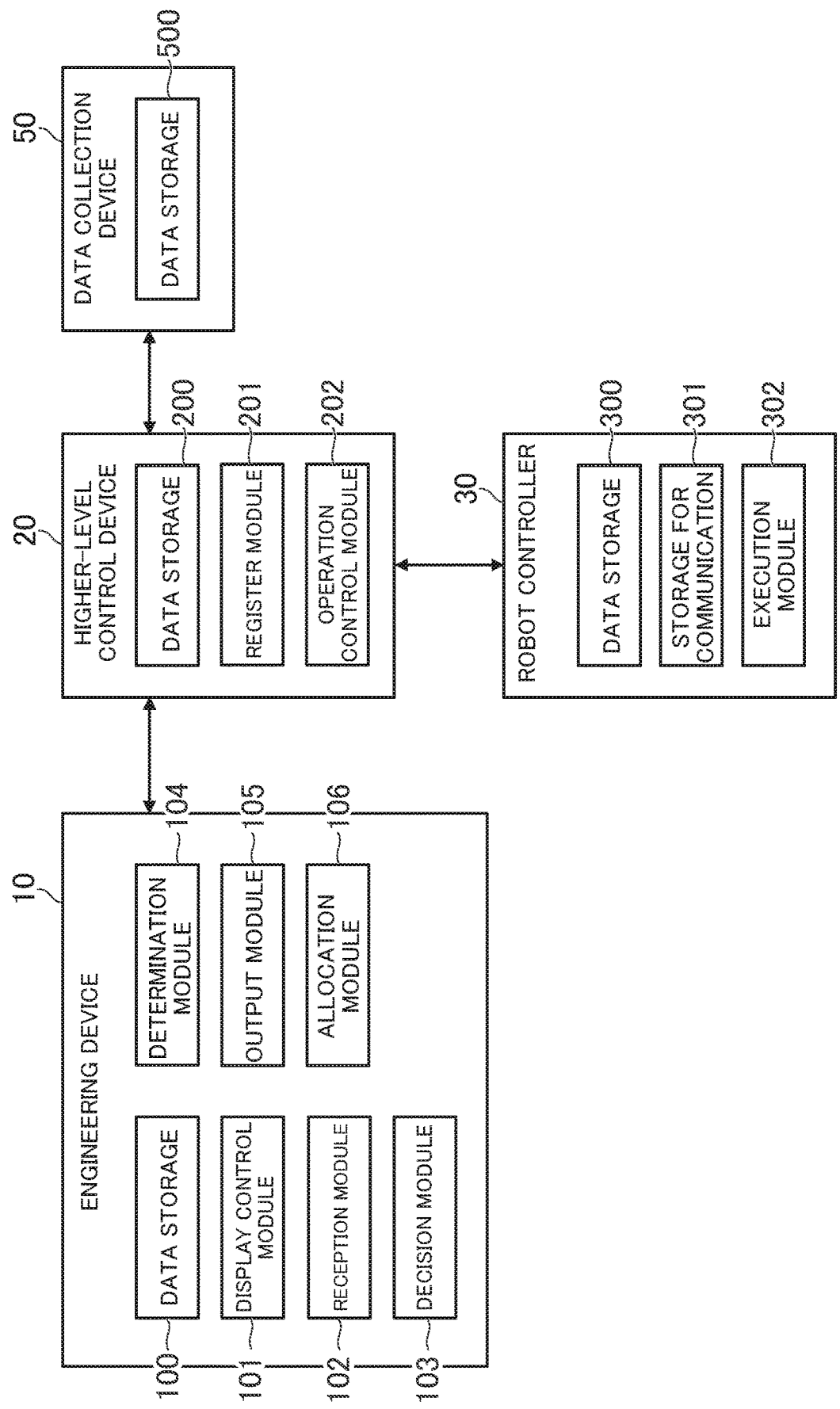

FIG.9

| OFFSET | FIRST TIER | SECOND TIER | THIRD TIER | FOURTH TIER | NAME |
|---|---|---|---|---|---|
| 0000 | InterfaceVer | | | | DATA STRUCTURE VERSION |
| . | . | . | . | . | . |
| . | . | . | . | . | . |
| . | . | . | . | . | . |
| 0012 | | SyncCounter | | | COMMUNICATION COUNTER FOR RECEPTION |
| 0014 | | FixData | if_ver | Major | MAJOR VERSION |
| . | | . | . | . | . |
| . | | . | . | . | . |
| . | | . | . | . | . |
| 0413 | | | | CmdReqid | COMMAND REQUEST ID |
| 0415 | | | | MainCmd | MAIN COMMAND |
| 0416 | | | AnsHeader_0 | SubCmd | SUB-COMMAND |
| 0417 | | | | ReturnCode | RETURN VALUE |
| 0418 | ResponsData | CmdAnswer | | AddDataOfs | OFFSET TO ADDITIONAL DATA |
| 0419 | | | AnsHeader_1 | SAME AS ABOVE | SAME AS ABOVE |
| . | | | . | . | . |
| . | | | . | . | . |
| . | | | . | . | . |
| 0504 | | | AnsData | | ANSWER DATA AREA |
| 1055 | | CollectHeader | Controllerid | | CONTROLLER IDENTIFICATION ID |
| . | | . | . | . | . |
| . | | . | . | . | . |
| . | | . | . | . | . |
| 1075 | | CollectData | | | DATA AREA |
| 2042 | | SyncCounter | | | COMMUNICATION COUNTER FOR TRANSMISSION |
| . | | . | . | . | . |
| . | | . | . | . | . |
| . | | . | . | . | . |
| 2163 | CommandData | | CmdReqid | | COMMAND REQUEST ID |
| 2165 | | CmdRequest | MainCmd | | MAIN COMMAND |
| 2166 | | | SubCmd | | SUB-COMMAND |
| 2167 | | | CmdArea | | COMMAND DATA AREA |
| 2500 | | | | CmdReqid | COMMAND REQUEST ID |
| 2502 | | | | MainCmd | MAIN COMMAND |
| 2503 | CmdAnsWork | CmdAnswerNow | AnsHeader | SubCmd | SUB-COMMAND |
| 2504 | | | | ReturnCode | RETURN VALUE |
| 2505 | | | | AddDataOfs | OFFSET TO ADDITIONAL DATA |
| 2506 | | | AnsData | | ANSWER DATA AREA |
| 2951 | FixMonSelect | GrpMonChSel | | | GROUP MONITOR CH SELECTION |
| . | . | . | . | . | . |
| . | . | . | . | . | . |
| . | . | . | . | . | . |
| 4259 | Dummy | | | | SPARE |

| No | SYSTEM CONFIGURATION | TRANSMISSION TYPE | START REGISTER NUMBER | END REGISTER NUMBER | WATCHDOG TIMER SETTING(ms) | COMMENT | OWN STATION PORT | ROBOT CONTROLLER IP ADDRESS | ROBOT CONTROLLER PORT | CONNECTION TYPE | PROTOCOL TYPE | CODE |
|---|---|---|---|---|---|---|---|---|---|---|---|---|
| 1 | B CONNECTION1 | TYPE X | GW00000 | GW04259 | 100 | | 5000 | 192.168.1.100 | 502 | CONNECTION1 | PROTOCOL1 | BIN |
| 2 | B CONNECTION2 | TYPE X | GW05000 | GW09259 | 100 | | 5001 | 192.168.1.101 | 502 | CONNECTION1 | PROTOCOL1 | BIN |
| 3 | B CONNECTION3 | TYPE X | GW10000 | GW14259 | 100 | | 5002 | 192.168.1.102 | 502 | CONNECTION1 | PROTOCOL1 | BIN |
| 4 | UNUSED | | | | 1000 | | | | | | | |
| 5 | UNUSED | | | | 1000 | | | | | | | |
| 6 | UNUSED | | | | 1000 | | | | | | | |
| 7 | UNUSED | | | | 1000 | | | | | | | |
| 8 | UNUSED | | | | 1000 | | | | | | | |

D2

ENGINEERING DEVICE, ENGINEERING METHOD, AND INFORMATION STORAGE MEDIUM

CROSS-REFERENCE TO RELATED APPLICATION

The present disclosure contains subject matter related to that disclosed in Japanese Priority Patent Application JP2020-113004 filed in the Japan Patent Office on Jun. 30, 2020, the entire contents of which are hereby incorporated by reference.

BACKGROUND OF THE INVENTION

1. Field of the Invention

The embodiments disclosed herein relate to an engineering device, an engineering method, and an information storage medium.

2. Description of the Related Art

In JP 2012-194678 A1, there is described a technology in which an operation of a higher-level control device, for example, a programmable logic controller (PLC), is described in a ladder chart to create a program and the higher-level control device executes the program.

SUMMARY OF THE INVENTION

According to one aspect of the present disclosure, there is provided an engineering device, which is configured to set a higher-level control device capable of controlling a control device for one or more industrial machines, the engineering device including circuitry configured to: receive specification of a register number of the higher-level control device; determine, based on the specified register number, a register range to be used for control of the control device by the higher-level control device; and allocate the determined register range among registers of the higher-level control device, for the control of the control device.

BRIEF DESCRIPTION OF THE DRAWINGS

FIG. 2 is a diagram for illustrating an example of a detailed definition screen.

FIG. 3 is a diagram for illustrating an example of the detailed definition screen with a window being displayed.

FIG. 4 is a diagram for illustrating an example of the detailed definition screen at the time when a system configuration is specified.

FIG. 5 is a diagram for illustrating an example of the detailed definition screen at the time when a start register number is specified.

FIG. 6 is a diagram for illustrating an example of the detailed definition screen at the time when communication setting for all robot controllers has been performed.

FIG. 8 is a functional block diagram for illustrating functions implemented in the production system.

FIG. 9 is a table for showing a data storage example of structure data.

FIG. 10 is a table for showing a data storage example of detailed definition data.

DESCRIPTION OF THE EMBODIMENTS

1. Overall Configuration of Production System

A higher-level control device capable of controlling a control device configured to control one or more industrial machines is configured to control the control device based on variables stored in a register range defined in advance. In this respect, in the related art, the register range of the higher-level control device is fixed and cannot be freely specified by a user. As a result of extensive research and development for allocating, for control of the control device, a freely-selected register range desired by the user among registers of the higher-level control device, the inventors have conceived of a novel and original engineering device and the like. A detailed description is now given of the engineering device and the like according to an embodiment of the present disclosure.

Figure 1:
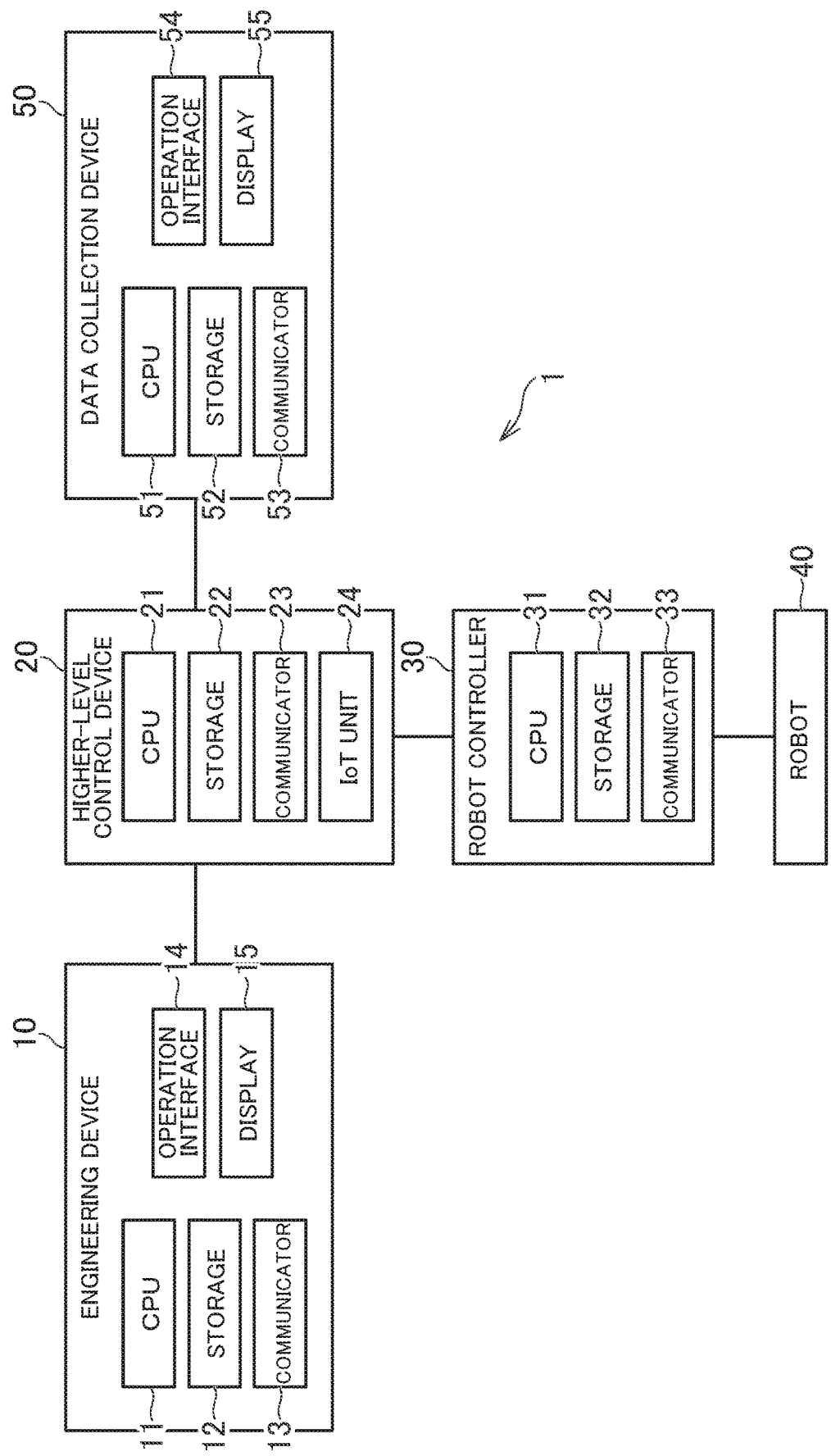
FIG. 1 is a diagram for illustrating an example of an overall configuration of a production system including an engineering device.

FIG. 1 is a diagram for illustrating an example of an overall configuration of a production system including the engineering device. As illustrated in FIG. 1, a production system 1 includes an engineering device 10, a higher-level control device 20, a robot controller 30, a robot 40, and a data collection device 50. In FIG. 1, each device is illustrated as one device, but may be provided as a plurality of devices.

Each device included in the production system 1 can be connected to any network. In this embodiment, a case in which the devices are connected to one another through a general network, for example, an Ethernet (trademark), is described, but the devices may be connected to one another through a network for industrial machines. For example, the devices may be connected to one another through different kinds of networks in such a manner that the higher-level control device 20, the engineering device 10, and the data collection device 50 are connected to one another through the general network, and that the higher-level control device 20 and the robot controller 30 are connected to each other through the network for industrial machines.

The engineering device 10 is a computer configured to set the higher-level control device 20 capable of controlling the robot controller 30 configured to control one or more robots 40. For example, the engineering device 10 is a personal computer, a cellular phone (including a smartphone), or a mobile terminal (including a tablet terminal). The engineering device 10 may be configured to set a device other than the higher-level control device 20.

In the engineering device 10, an engineering tool for supporting the user's setting work is installed. For example, the engineering tool is used for various purposes such as creation of a program, parameter setting, communication setting between devices, definition of a register, and definition of a variable. The engineering device 10 includes a CPU 11, a storage 12, a communicator 13, an operation interface 14, and a display 15.

The CPU 11 includes at least one processor. The CPU 11 is a kind of circuitry. The storage 12 includes a RAM or a hard disk drive, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The higher-level control device 20 is a computer capable of controlling another device. The higher-level control device 20 is only required to have a function of controlling another device, and is not always required to control another device. For example, the higher-level control device 20 may only collect data from the robot controller 30 without controlling the robot controller 30. The entire production system 1 may be referred to as "cell," which is a unit smaller than a line, and in this case, the higher-level control device 20 may be referred to as "cell controller." The higher-level control device 20 may correspond to a kind of programmable logic controller (PLC).

In this embodiment, the higher-level control device 20 can control the robot controller 30. For example, the higher-level control device 20 may be capable of controlling a plurality of robot controllers 30. Further, for example, the higher-level control device 20 may be capable of controlling a plurality of devices being mutually different kinds of devices. The number and kinds of devices to be controlled by the higher-level control device 20 are not limited to the examples of this embodiment, and any number and any kinds of devices may be set as devices to be controlled.

The higher-level control device 20 includes a CPU 21, a storage 22, a communicator 23, and an IoT unit 24. The physical configuration of each of the CPU 21, the storage 22, and the communicator 23 may be the same as that of the CPU 11, the storage 12, and the communicator 13, respectively. The IoT unit 24 is a unit for transmitting data to another computer through the network. For example, the IoT unit 24 includes a CPU, a storage, and a communicator. The physical configuration of each of the CPU, the storage, and the communicator that are included in the IoT unit 24 may be the same as that of each of the CPU 11, the storage 12, and the communicator 13, respectively.

The CPU 21, the storage 22, and the communicator 23 may be included in a first casing (hereinafter referred to as "CPU unit") of the higher-level control device 20, and the IoT unit 24 may be included in a second casing (hereinafter referred to as "IoT unit") of the higher-level control device 20. In this case, the engineering device 10 can be connected to each of the CPU unit and the IoT unit. The user may connect the engineering device 10 to the CPU unit, or may connect the engineering device 10 to the IoT unit.

The robot controller 30 is a computer configured to control the robot 40. The robot controller 30 is an example of the control device. Accordingly, the term "robot controller 30" as used in this embodiment can be read as "control device." The control device may be any kind of device that is configured to control an industrial machine described later. For example, the control device may be a PLC, a motion controller, a motor controller, an inverter, a converter, a machine tool, a conveyance device, or a semiconductor manufacturing apparatus. The control device can control any number of industrial machines. The control device may control only one industrial machine, or may control a plurality of industrial machines. The control device corresponds to a higher-level device for an industrial machine. The higher-level control device 20 may control the control device, and thus corresponds to a device on a higher level than the control device.

The robot 40 is an industrial robot controlled by the robot controller 30. For example, the robot 40 includes a robot arm, a robot hand, a motor, and a sensor. It suffices that the sensor is a sensor capable of detecting a physical quantity, and the sensor may be, for example, a motor encoder, a torque sensor, a motion sensor, a grip sensor, a vision sensor, or a temperature sensor. The robot 40 is an example of the industrial machine. Accordingly, the term "robot 40" as used in this embodiment can be read as "industrial machine." The industrial machine is a collective term for machines configured to assist or substitute human work and peripheral machines thereof. For example, an industrial robot, a servo amplifier, or a motor corresponds to the industrial machine. In a broader sense, the higher-level control device 20, the robot controller 30, and the sensor are each a kind of industrial machine as well. A device, for example, the PLC described above, is a kind of industrial machine as well.

The data collection device 50 is a computer configured to collect data in the production system 1. The data collection device 50 is a personal computer, a server computer, a cellular phone (including a smartphone), or a mobile terminal (including a tablet terminal). The data collection device 50 includes a CPU 51, a storage 52, a communicator 53, an operation interface 54, and a display 55. The physical configuration of each of the CPU 51, the storage 52, the communicator 53, the operation interface 54, and the display 55 may be the same as that of each of the CPU 11, the storage 12, the communicator 13, the operation interface 14, and the display 15, respectively.

The programs and data described as being stored in each of the devices may be supplied through the network. Moreover, the hardware configuration of each device is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

Further, for example, the higher-level control device 20 may be connected to an industrial machine, for example, a robot directly controlled by the higher-level control device 20. Further, for example, the higher-level control device 20 and the robot controller 30 may each include a circuit referred to as "FPGA" or "ASIC." Further, for example, the higher-level control device 20 and the robot controller 30 may each be connected to the above-mentioned sensor, the input/output device, or the like.

2. Outline of Production System

The higher-level control device 20 in this embodiment is configured to control the robot controller 30 based on each of the plurality of variables. The variable is information referred to by a control program for controlling the robot controller 30. The control program may also rewrite the variable. For example, the variable indicates a result of unfinished calculation, presence or absence of an alarm, or a physical quantity detected by a sensor (for example, a torque value detected by a torque sensor or a rotation speed of a motor detected by a motor encoder).

For example, when the robot controller 30 executes a plurality of processes in a predetermined order, an execution order of the processes is described in the control program. The higher-level control device 20 sends an instruction to the robot controller 30 based on the control program. The variable may be used as an execution condition of the process. For example, the robot controller 30 stores a variable for starting the process, a variable for suspending the process, or a variable for ending the process. The variable may be referred to as "input/output variable."

The "process" is a task or an operation to be performed by the robot controller 30. The process may be composed of only one task, or may be composed of a combination of a plurality of tasks. The process may have any content in accordance with the use of the robot controller 30. For example, the process is recognition of a workpiece, gripping of a workpiece, opening/closing of a door, setting of a workpiece, or machining using a machine tool. The robot controller 30 performs at least one process. The number of processes to be performed by the robot controller 30 may be any number. The robot controller 30 may perform only one process, or may perform a plurality of processes. The robot controller 30 performs the process based on the instruction received from the higher-level control device 20 and a device program stored in the robot controller 30 itself.

The device program is a program defining an operation of the robot controller 30. In the device program, each procedure of each process is defined. The device program can be created in any language in accordance with the robot controller 30, and is created in, for example, a ladder language or a robot language. The control program can be created in any language as well. In this embodiment, a device program is prepared for each process. Accordingly, when a certain robot controller 30 is to perform "n" processes ("n" is a natural number), the robot controller 30 stores at least "n" device programs.

A type of a variable is not limited to the above-mentioned example. For example, there may be a variable indicating a command sent from the higher-level control device 20 to the robot controller 30. Further, for example, there may be another variable indicating the start of execution of a command indicated by one variable. Further, for example, there may be a variable indicating a name of a robot program to be executed by the robot controller 30 and an execution condition therefor. The robot program is a program to be executed by the robot controller 30, and for example, the device program described above is a kind of robot program. A program called "job" is a kind of robot program as well. Further, for example, there may be a variable indicating a response sent from the robot controller 30 to the higher-level control device 20. Further, for example, there may be a variable that does not directly relate to control of the robot controller 30.

The user operates the engineering device 10 to set the higher-level control device 20 storing such variables as described above. The term "user" as used in this embodiment means a user of the higher-level control device 20. The user of the higher-level control device 20 may be the same as a user of the robot controller 30 and a user of the data collection device 50, but in this embodiment, a case in which those users are different is described.

For example, the user uses the engineering tool installed in the engineering device 10 to allocate the registers of the higher-level control device 20. The allocation of the registers is performed as part of communication setting between the higher-level control device 20 and the robot controller 30. When the user operates the engineering device 10 to activate the engineering tool, a menu screen for performing various kinds of setting is displayed on the display 15. When the user selects an icon for performing communication setting from the menu screen, a detailed definition screen for defining details of the communication setting is displayed on the display 15.

FIG. 2 is a diagram for illustrating an example of the detailed definition screen. As illustrated in FIG. 2, on a detailed definition screen G1, it is possible to perform communication setting for each of a plurality of devices communicating to/from the higher-level control device 20. In this embodiment, a case in which the higher-level control device 20 can communicate to/from up to eight devices is described, but an upper limit number of devices capable of communicating to/from the higher-level control device 20 may be any number, and is not limited to eight. In the example of FIG. 2, the communication setting has not been performed for any device, and information on the communication setting is not displayed on the detailed definition screen G1.

In the example of FIG. 2, a system configuration, a transmission type, a start register number, an end register number, a watchdog timer setting, and a comment can be set. The system configuration is a method for connection to the device. The system configuration can also be said to be a communication protocol. For example, a plurality of connection methods are prepared, and the user specifies any one of the connection methods. The transmission type is a type of transmission to be used in the specified system configuration. For example, a plurality of types are prepared, such as a built-in Ethernet (trademark), and the user specifies any one of the types.

The start register number is the first register number in the register range allocated for control of the device. The register number is information for identifying each individual register. The register number is a concept similar to an address, but has a different meaning from that of the address in a strict sense. In this embodiment, a variable is stored in the registers included in the CPU 21, and hence the register number indicates each individual register of the CPU 21.

The register range is a bandwidth of register numbers. The register range includes a plurality of register numbers. The number of register numbers included in the register range may be any number. In this embodiment, a case in which the register numbers included in the register range are serial numbers is described, but the register numbers included in the register range are not required to be serial numbers. The registers included in the register range allocated to a given device store variables for control of the given device, and do not store variables for control of another device.

The end register number is the last register number in the register range allocated for the control of the device. In this embodiment, the register range is formed of serial numbers, and hence a register range for a given device is from the start register number specified for the given device to the end register number. The end register number is a number obtained by adding an offset corresponding to a size defined in a structure described later to the start register number.

The watchdog timer setting is a timer for monitoring whether or not the device is normal. In the example of FIG. 2, a default value is set as a value of the watchdog timer setting. The watchdog timer setting may have a value corresponding to a system configuration specified by the user, or may have a value specified by the user. The comment is supplementary description relating to the communication setting for the device, and the user can input any character string.

In this embodiment, a case in which three robot controllers 30 are connected to the higher-level control device 20 and communication setting for those three robot controllers 30 is performed is described as an example. For example, the user selects the system configuration of "No. 1" displayed on the detailed definition screen G1 in order to perform the communication setting for the first robot controller 30. When the system configuration of "No. 1" is selected, a window for specifying the system configuration of the first robot controller 30 is displayed.

FIG. 3 is a diagram for illustrating an example of the detailed definition screen G1 with the window being displayed. As illustrated in FIG. 3, each of a plurality of system configurations prepared in advance is displayed on a window W10. When the user specifies a freely-selected system configuration from the window W10, an input form for performing detailed setting corresponding to the specified system configuration is displayed. The transmission type may be automatically specified based on the system configuration specified by the user, or may be specified by the user from among a plurality of transmission types.

FIG. 4 is a diagram for illustrating an example of the detailed definition screen G1 at the time when the system configuration is specified. As illustrated in FIG. 4, a connection number, an own station port, an IP address of the robot controller 30, a port of the robot controller 30, a connection type, a protocol type, and a code are displayed in an input form F10.

The connection number is a number allocated to the device communicating to/from the higher-level control device 20. The own station port is a port to be used for communication to/from the robot controller 30 among a plurality of ports included in the communicator 23. The IP address of the robot controller 30 may be set in advance, but in this embodiment, is specified by the user from the input form F10.

The port of the robot controller 30 is a port to be used for communication to/from the higher-level control device 20 among a plurality of ports included in the communicator 33. Each of the connection type and the protocol type is a type of communication, for example, a user datagram protocol (UDP), a transmission control protocol (TCP), or Modbus. The code is a format of data to be transmitted and received, and examples of the format include a binary code. In this embodiment, a case in which each of the port of the robot controller 30, the connection type, the protocol type, and the code has a fixed value is described, but the user may specify those values.

For example, the user specifies a freely-selected value for each of the own station port and the IP address of the robot controller 30 in the input form F10. When at least one of the own station port or the IP address corresponding to a given robot controller 30 and at least one of the own station port or the IP address corresponding to another robot controller 30 overlap with each other, an error message may be displayed. After the user finishes the input to the input form F10, the user specifies a freely-selected register number as the start register number of "No. 1." The user may specify the start register number before the input to the input form F10.

FIG. 5 is a diagram for illustrating an example of the detailed definition screen G1 at the time when the start register number is specified. As illustrated in FIG. 5, when the user specifies the start register number, the end register number is automatically specified. In the example of FIG. 5, a size corresponding to 4,260 register numbers is prepared for the structure of the system configuration specified by the user, and "GW04259," which is later than "GW00000" specified by the user by the size of the structure, is specified as the end register number. Of the registers included in the CPU 21 of the higher-level control device 20, a register range including 4,260 register numbers from "GW00000" to "GW04259" is allocated for control of the first robot controller 30.

The user specifies the watchdog timer setting and the comment as the requirement arises. Thus, the communication setting for the first robot controller 30 is completed. The user subsequently performs the communication setting for the second and third robot controllers 30. The communication setting is performed for the second and third robot controllers 30 in the same flow as that of the first robot controller 30.

FIG. 6 is a diagram for illustrating an example of the detailed definition screen G1 at the time when communication setting for all the robot controllers 30 has been performed. As illustrated in FIG. 6, the user specifies the register range, the own station port, and the IP address so as to prevent an overlap among the robot controllers 30. Communication settings for the second and third robot controllers 30 are input to, for example, input forms F11 and F12. When the user performs a predetermined operation from the detailed definition screen G1, the communication settings of each robot controller 30 are saved.

In this embodiment, when the communication settings are to be saved, it is determined whether or not the register ranges specified by the user overlap with each other. For example, it is determined whether or not the register range for a given robot controller 30 and the register range for another robot controller 30 overlap with each other. In another example, it is determined whether or not the register range for a given robot controller 30 and a register range to be used for a purpose other than the control of the robot controller 30 overlap with each other.

Figure 7:
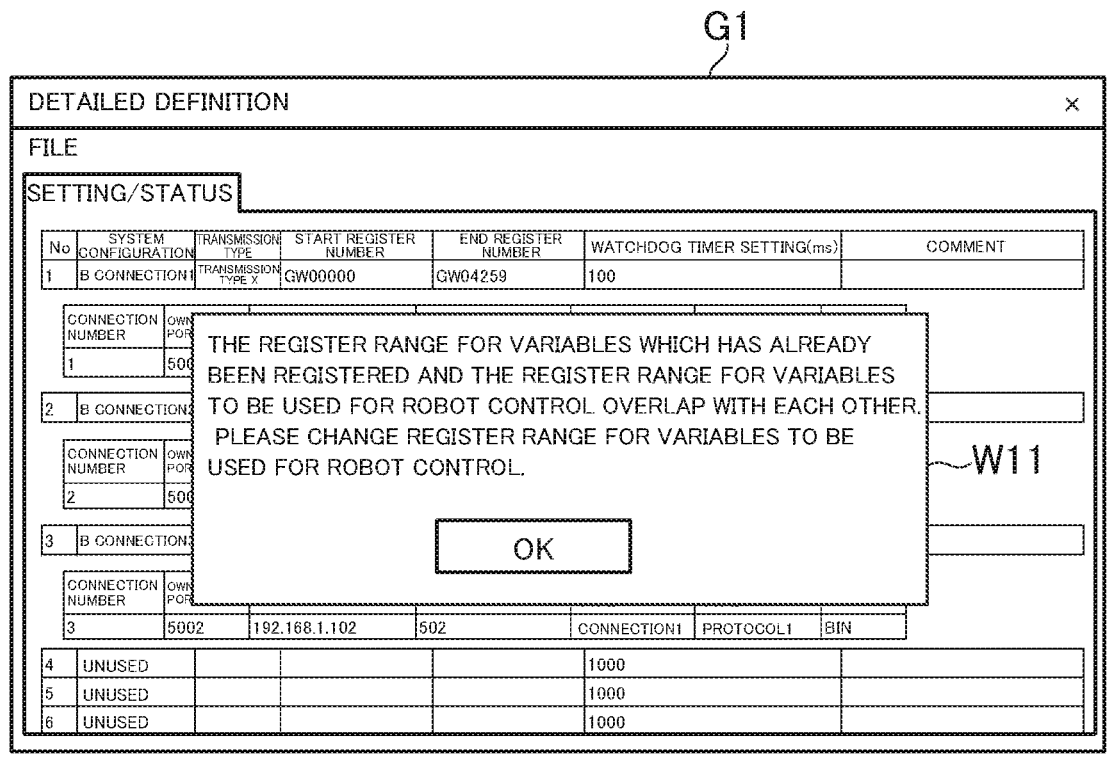
FIG. 7 is a diagram for illustrating an example of the detailed definition screen at the time when register ranges overlap with each other.

FIG. 7 is a diagram for illustrating an example of the detailed definition screen G1 at the time when the register ranges overlap with each other. As illustrated in FIG. 7, when the register ranges overlap with each other, a window W11 including a message to that effect is displayed. When the window W11 is displayed, the user again specifies the start register number for the robot controller 30 so as to prevent the register ranges from overlapping with each other. In this embodiment, a case in which the window W11 is displayed only when the register ranges overlap with each other is described, but the window W11 including a message prompting the user to prevent the register ranges from overlapping with each other may be displayed irrespective of whether or not the register ranges overlap with each other.

As described above, in the engineering tool in this embodiment, when the start register number for a given robot controller 30 is specified, the register range defined in the structure is allocated for the control of the robot controller 30. Thus, a freely-selected register range desired by the user can be allocated for the control of the robot controller 30. The production system 1 is described below in detail.

3. Functions implemented in Production System

FIG. 8 is a functional block diagram for illustrating functions implemented in the production system 1. In this embodiment, functions implemented in each of the engineering device 10, the higher-level control device 20, the robot controller 30, and the data collection device 50 are described.

3-1. Functions implemented by Engineering Device

As illustrated in FIG. 8, the engineering device 10 includes a data storage 100, a display control module 101, a reception module 102, a decision module 103, a determination module 104, an output module 105, and an allocation module 106. The data storage 100 is mainly implemented by the storage 12, and each of the display control module 101, the reception module 102, the decision module 103, the determination module 104, the output module 105, and the allocation module 106 is mainly implemented by the CPU 11.

Data Storage

The data storage 100 is configured to store data required for setting the higher-level control device 20. In this embodiment, as examples of this data, structure data indicating a structure defined in a communication profile and detailed definition data indicating communication settings defined on the detailed definition screen G1 are described. The communication profile is an interface configured to connect the higher-level control device 20 and the robot controller 30 to each other. The communication profile may have the same meaning as that of the communication protocol, and a communication procedure and a format of data are defined. In this embodiment, the communication profile is specified by specifying the system configuration.

FIG. 9 is a table for showing a data storage example of the structure data. As shown in FIG. 9, structure data D1 is data in which a register system in the communication profile is defined. In other words, the structure data D1 is data indicating the format of data to be transmitted and received in communication defined in the communication profile. When a plurality of communication profiles are prepared, the structure data D1 is prepared for each communication profile. In this case, an offset width (length of the register range) may differ for each communication profile. The structure data D1 shows a relationship between the register number included in the register range and information stored at the register number. For example, the structure data D1 stores an offset, tiers, and a name.

The offset is a register number based on the start register number. The offset can also be said to be a register number obtained when counted from the start register number or a register number relative to the start register number. In the data storage example shown in FIG. 9, the start register number specified by the user corresponds to "0000" being the first number of the offset. The end register number automatically set by the engineering tool corresponds to "4259" being the last number of the offset. In this embodiment, a register range including a total of 4,260 register numbers from "0000" to "4259" is allocated to the robot controller 30.

The tier is information indicating an attribute of a variable stored in a register corresponding to the offset. The attribute is information indicating the class of the variable. The attribute can also be said to be information indicating the property or characteristic of the variable. When the attributes are represented by tiers, the variable in the lower tier is represented as having a more specific class. In the data storage example shown in FIG. 9, four tiers are used, but the number of tiers may be freely set. The attributes are not required to have the concept of tiers. In addition, the variables are not required to be classified by attributes.

The name is a name of the variable stored in the register corresponding to the offset. In some cases, it may not be possible to store a variable in the register corresponding to one register number depending on the data size of the variable, and hence such a variable is stored across a plurality of register numbers. A variable having a larger data size requires more register numbers. Of the first to fourth tiers, the name in the lowest tier of each variable (for example, "CmdReqid" at "No. 2500") is also a kind of name of the variable.

In this embodiment, only main variables among the variables defined in the structure data D1 are described. For example, a variable group of offsets from "0012" to "2041" are the same data as reception data received from the robot controller 30 by the higher-level control device 20. This variable group includes a plurality of answer headers including a command request ID at "0413," a main command at "0415," a sub-command at "0416," a return value at "0417," and an offset to additional data at "0418."

The command request ID is an example of command request information. The description on the command request ID in this embodiment can be read as "command request information." The command request information is information for requesting the robot controller 30 to execute a command. For example, the command is executed when the command request information is updated. The update refers to a change in value. Further, for example, the command is executed when the command request information indicates a predetermined value. The command request information may have any format other than the ID, and may be called by a name other than the ID. The command request ID in this embodiment is represented by a numerical value, and is incremented each time the command is executed.

The main command is information indicating a function requested for the robot controller 30 among a plurality of functions provided to the robot controller 30. In this embodiment, there are prepared three functions including a robot controlling function of controlling the robot 40, a monitoring function of monitoring an action of the robot 40, and a collection function of collecting data relating to the action of the robot 40, and the main command has a value indicating any of those functions. The robot controller 30 may not have the monitoring function or the collection function, or may have another function. The robot controller 30 may also have only a single function. In this case, the main command can be omitted.

The sub-command is information indicating an operation requested for the robot controller 30 among a plurality of operations that can be executed by the robot controller 30. In this embodiment, a plurality of operations are prepared for each function indicated by the main command. The sub-command indicates any one of a plurality of operations prepared for the function indicated by the main command. That is, in this embodiment, a specific operation to be executed by the robot controller 30 is specified by a combination of the main command and the sub-command.

For example, for the main command of the robot controlling function, there are prepared sub-commands of, for example, resetting of an alarm or an error, stopping of a hold, control of a power source, locking up of an HMI, changing of a cycle period, mode switching, execution (starting) of a robot program, selection of a robot program, a robot action toward the target position, and a robot action having a pulse being specified for each axis. Further, for example, for the main command of the monitoring function, there are prepared sub-commands of, for example, reading of monitor settings, writing of monitor settings, and reading of robot program information. Further, for example, for the main command of the collection function, there are prepared sub-commands of, for example, reading of a collection setting state, writing of collection settings, starting of collection, and ending of the collection.

The return value is information indicating an operation result of the robot controller 30. For example, when the return value being a first value (for example, 0) means that the operation has been normally completed. Further, for example, the return value being a second value (for example, 1) means that an abnormality has occurred in the operation. The offset to the additional data is information for identifying the register number at which additional data included in response data from the robot controller 30 is stored. The additional data is added only when the main command and the sub-command are in a predetermined combination.

Further, for example, the variable group from "0012" to "2041" includes an answer data area from "0504" to "1054" in addition to the above-mentioned answer header. Data including the additional data is stored in the answer data area.

Further, for example, a variable group of offsets from "2042" to "2499" is the same data as transmission data transmitted to the robot controller 30 by the higher-level control device 20. This variable group includes a command request ID at "2163," a main command at "2165," a sub-command at "2166," and a command data area from "2167" to "2499." The meanings of the command request ID, the main command, and the sub-command are as described above.

The command request ID, the main command, and the sub-command from "2163" to "2166" are transmitted from the higher-level control device 20 to the robot controller 30. The command request ID, main command, and sub-command from "0413" to "0416" described above are received from the robot controller 30. A mismatch between the values of the command request ID, main command, and sub-command from "2163" to "2166" and the values of the command request ID, main command, and sub-command from "0413" to "0416" indicates that there is a high risk in that some kind of abnormality has occurred.

Data relating to the operation requested for the robot controller 30 is stored in the command data areas from "2167" to "2499." For example, in the case of the selection of a robot program, the robot program name and a start portion of the robot program are stored in the command data area. In addition, the command data area may store data, for example, parameters required for executing the robot program, or may store information, for example, identification information on a robot program group registered by the user.

A variable group of offsets from "2500" to "2950" corresponds to the latest reception data received from the robot controller 30 by the higher-level control device 20. The structure data D1 may also include a register range for the monitoring function and a register range for the collection function. Variables for monitoring the operation of the robot 40 are stored in the register range for the monitoring function. Variables to be collected by the data collection device 50 are stored in the register range for the collection function.

FIG. 10 is a table for showing a data storage example of detailed definition data D2. As shown in FIG. 10, the detailed definition data D2 is data indicating setting contents specified from the detailed definition screen G1. For example, the detailed definition data D2 stores a device number, the system configuration, the transmission type, the start register number, the end register number, a watchdog timer setting value, the comment, the own station port, the IP address of the robot controller 30, the port of the robot controller 30, the connection type, the protocol type, and the code. Those pieces of information are as described above with reference to the detailed definition screen G1 illustrated in FIG. 2 to FIG. 7. When the user saves the settings, the detailed definition data D2 is updated.

The data stored in the data storage 100 is not limited to the above-mentioned example. For example, the data storage 100 stores the engineering tool. It is assumed that the engineering tool includes a program for displaying various screens including the detailed definition screen G1 and a program for calculating the end register number based on the start register number. Further, for example, the data storage 100 may store programs and parameters created by the user through use of the engineering tool.

Display Control Module

The display control module 101 causes the display 15 to display various screens of the engineering tool. For example, the display control module 101 displays the detailed definition screen G1. As described with reference to FIG. 2 to FIG. 7, the display control module 101 displays the detailed definition screen G1 and updates the display based on the user's operation.

Reception Module

The reception module 102 is configured to receive specification of the register number of the higher-level control device 20. For example, the reception module 102 receives the specification of the start register number. The register number may be specified by any method. For example, the specification of the start register number may be received by inputting a numerical value to an input form, or may be received by selecting a pull-down menu or a button. The same applies to specification of the other values, and the specification may be performed by an operation that can be input from the operation interface 14.

The reception module 102 may receive the specification of the register number that can specify a register range. For example, the reception module 102 may receive the specification of the end register number. In this case, the decision module 103 described later may acquire a number earlier than the specified end register number by a predetermined value as the start register number. In another example, the reception module 102 may receive the specification of an intermediate register number later than the start register number and earlier than the end register number. In this case, the decision module 103 described later may acquire a number earlier than the specified register number by a predetermined value as the start register number, and acquire a number later than the specified register number by a predetermined value as the end register number.

The reception module 102 may receive the specification of a register number that is not included in the register range in place of a register number included in the register range. For example, the reception module 102 may receive the specification of a number immediately before the start register number. In this case, the decision module 103 described later may acquire a number immediately after the specified register number as the start register number. In another example, the reception module 102 may receive the specification of a number immediately after the end register number. In this case, the decision module 103 described later may acquire a number immediately before the specified register number as the end register number.

When the offset of the register range is not set to a fixed value as in this embodiment, the reception module 102 may receive the specification of both the start register number and the end register number. In this case, the register range has a freely-selected length specified by the user. In this case as well, a register number other than the start register number and the end register number may be specified. Further, the start register number and the length of the register range may be specified. That is, the length of the register range may be variable based on the user's operation.

In this embodiment, the higher-level control device 20 controls each of the plurality of robot controllers 30, and hence the reception module 102 receives the specification of the register number for each robot controller 30. The reception module 102 receives the specification of as many register numbers as the number of robot controllers 30. The reception module 102 receives the specification of at least "n" register numbers corresponding to the "n" robot controllers 30, respectively.

Decision Module

The decision module 103 is configured to determine, based on the specified register number, the register range to be used for the control of the robot controller 30 by the higher-level control device 20. This register range stores a variable group to be subjected to at least one of referring or rewriting by a control program for controlling the corresponding robot controller 30. Determining the register range refers to determining at least the start register number and the end register number. When the register range is not formed of serial numbers and spans a plurality of ranges (when the register range includes a plurality of ranges), determining at least the start register number and the end register number for each individual range corresponds to determining the register range.

In this embodiment, the user specifies the start register number, and hence the decision module 103 determines, as the register range, a range from the specified start register number to the end register number obtained by adding a predetermined value to the start register number. It suffices that this predetermined value is a numerical value defined in advance, and in this embodiment, is assumed to be the last "4259" of the offsets defined in the structure data D1 in the communication profile.

The decision module 103 determines the register range based on the specified register number and a data structure (structure defined in the structure data D1) defined in the communication profile between the robot controller 30 and the higher-level control device 20. The decision module 103 determines, as the end register number, a number obtained by adding the size defined in the structure data D1 to the specified start register number. The decision module 103 determines a range from the start register number to the end register number as the register range. Accordingly, when the same communication profile is specified, the register range includes "4,300" register numbers for any robot controller 30.

In this embodiment, the higher-level control device 20 is capable of controlling a plurality of robot controllers 30, and hence the decision module 103 determines, for each robot controller 30, a register range to be used for the control of the robot controller 30 by the higher-level control device 20 for each robot controller 30 based on the register number specified for the each robot controller 30. The decision module 103 determines as many register ranges as the number of robot controllers 30. That is, the decision module 103 determines "n" register ranges corresponding to the "n" robot controllers 30, respectively.

Determination Module

The determination module 104 is configured to determine whether or not the register range determined by the decision module 103 and another register range to be used for another purpose overlap with each other. The another purpose is a purpose other than the control of the corresponding robot controller 30. Examples of the another purpose include purposes of control of another robot controller 30, control of a device other than the robot controller 30 (for example, a device immediately subordinate to the higher-level control device 20), collection of data to be transmitted to the data collection device 50, analysis of data, and loading of a program and parameters. Information for identifying another register range to be used for another purpose is assumed to be stored in advance in the data storage 100.

For example, the determination module 104 determines that the register range determined by the decision module 103 and another register range to be used for another purpose overlap with each other when those register ranges overlap with each other in terms of even one register number. The determination module 104 may also determine that the register range determined by the decision module 103 and another register range to be used for another purpose overlap with each other when those register ranges overlap with each other in terms of the number of registers which is equal to or larger than a threshold value. In addition, for example, the determination module 104 may determine that the register range determined by the decision module 103 and another register range to be used for another purpose do not overlap with each other when those register ranges overlap with each other but overlapping portions are spare registers.

Output Module

The output module 105 is configured to output a predetermined alert when it is determined that the register range determined by the decision module 103 and another register range overlap with each other. In this embodiment, the window W11 illustrated in FIG. 7 corresponds to the alert.

It suffices that the alert is a visually recognizable image, and the alert may be an image other than the window W11. For example, a message displayed separately from the window W11, a predetermined icon, or blinking the screen may correspond to the alert. The output module 105 does not output the alert when the overlap is not determined by the determination module 104, and outputs the alert when the overlap is determined by the determination module 104. The alert may be output by a sound emitted from a speaker, vibrations of a vibrator, or blinking of an LED light. In addition, the alert may be output by another method, for example, by transmitting an electronic mail.

Allocation Module

The allocation module 106 is configured to allocate the register range determined by the decision module 103 among the registers of the higher-level control device 20, for the control of the robot controller 30. Allocating a register range refers to securing or reserving register numbers indicated by the register range corresponding to a given robot controller 30, for the control of the robot controller 30. The register range allocated by the allocation module 106 becomes a storage area dedicated for the control of the robot controller 30 corresponding to that register range.

For example, the allocation module 106 allocates the register range by writing the detailed definition data D2 to the data storage 200 of the higher-level control device 20. The register range may be allocated by writing other data. It suffices that, in the data to be written, at least information (for example, an IP address or a device name) for identifying the robot controller 30 and a register range corresponding thereto is associated with each other. That is, it suffices that data defining the register range of registers that store variables for the control of the robot controller 30 is written to the data storage 200 of the higher-level control device 20. The higher-level control device 20 refers to the data written to itself to identify which register range has been allocated to which robot controller 30.

In this embodiment, the higher-level control device 20 is capable of controlling the plurality of robot controllers 30, and hence the allocation module 106 allocates, for each robot controller 30, the register range determined for the each robot controller 30 for the control of the each robot controller 30. The allocation module 106 allocates register ranges corresponding to the "n" robot controllers 30, respectively. In the data storage example shown in FIG. 10, the allocation module 106 allocates a register range from "GW00000" to "GW04259" for the control of the first robot controller 30. The allocation module 106 allocates a register range from "GW05000" to "GW09259" for the control of the second robot controller 30. The allocation module 106 allocates a register range from "GW10000" to "GW14259" for the control of the third robot controller 30.

For example, the robot controller 30 stores a program for performing a predetermined operation, and the register range includes a register number for a command area for storing a command for calling the program of the robot controller 30 and causing the robot controller 30 to execute the program. The allocation module 106 allocates, for the control of the robot controller 30, the register range including the register number for the command area. The program is a device program or a program of a robot program.

In this embodiment, the area of all or a part of the offsets from "2163" to "2499" shown in FIG. 9 corresponds to the command area. It suffices that the command area in the embodiment is an area that can store at least one command. For example, the command area may be an area for storing a single command in place of an area for storing a plurality of commands, for example, the main command and the sub-command. This command is information for calling the device program or a part of processing (for example, a robot program) included in the device program.

For example, the register range includes: a register number for a command area for storing a command directed to the robot controller 30; and a register number for a command request ID area for storing command request ID for requesting execution of a command stored in the command area. The allocation module 106 allocates, for the control of the robot controller 30, the register range including the register number for the command area and the register number for the command request ID area. In this embodiment, the offset of "2163" at which the command request ID is stored corresponds to the command request ID area. The offset of "2165" at which the main command is stored and the offset of "2166" at which the sub-command is stored correspond to the command area.

Further, the register range may be used for at least one of monitoring or data collection relating to an operation of the robot controller 30 in addition to the control of the robot controller 30. For example, the allocation module 106 allocates the determined register range for the control of the robot controller 30 and at least one of the monitoring or the data collection. In this embodiment, the register ranges are allocated for both of those, but only any one of those register ranges may be allocated. A variable indicating a detection result of detecting the action of the robot 40 by the sensor is stored in the register range for the monitoring. Variables indicating the operation result of the robot controller 30 and a detection result of a center are stored in the register range for the data collection.

3-2. Functions implemented by Higher-level Control Device

As illustrated in FIG. 8, the higher-level control device 20 includes the data storage 200, a register module 201, and an operation control module 202. The data storage 200 is mainly implemented by the storage 22. Each of the register module 201 and the operation control module 202 is mainly implemented by the CPU 21.

Data Storage

The data storage 200 is configured to store data for controlling the robot controller 30. For example, the data storage 200 stores the control program and the parameters. Further, for example, the data storage 200 may store firmware or another program, or may store a program for transmitting data to the data collection device 50. The operation control module 202 described later is configured to control the robot controller 30 based on those programs and parameters.

Further, for example, the data storage 200 stores the setting contents set by the engineering device 10. In this embodiment, the registers are allocated by the allocation module 106 of the engineering device 10, and hence the data storage 200 stores the detailed definition data D2. The detailed definition data D2 is the same as that stored in the data storage 100 of the engineering device 10. The data storage 200 may store only a part of the detailed definition data D2.

Register Module

The register module 201 is configured to store each of a plurality of variables in the register range allocated by the engineering device 10. In this embodiment, a case in which the register module 201 is a set of a plurality of registers included in the CPU 21 is described, but the register module 201 may be a set of a plurality of registers included in the storage 22 or another information storage medium. The register module 201 may store variables other than the variables for the control of the robot controller 30. The register module 201 stores, in the register range corresponding to each robot controller 30 allocated by the allocation module 106, the variables for the control of the robot controller 30.

Operation Control Module

The operation control module 202 is configured to control the operation of the robot controller 30 based on the plurality of variables and the control program. For example, the operation control module 202 writes a command directed to a given robot controller 30 to a register included in the register range corresponding to the given robot controller 30. The operation control module 202 refers to the detailed definition data D2 recorded in the data storage 200 to identify which robot controller 30 corresponds to which register range, and writes a command to a register included in the identified register range. The command written to the register is transmitted to the robot controller 30 by the operation control module 202.

In this case, processing of the operation control module 202 is described by taking, as an example, processing to be performed when the first robot controller 30 executes a robot program. In this embodiment, a case in which the selection of a robot program and the execution of a robot program are prepared as separate commands is described, but those may be combined as one command. That is, a robot program may be executed immediately after the robot program is selected.

As shown in FIG. 10, "GW00000" to "GW04259" are allocated as the register range corresponding to the first robot controller 30. The operation control module 202 writes a value (for example, 1) indicating the robot controlling function to the register at "GW2165" as the main command. The operation control module 202 writes a value (for example, 3) indicating the robot program selection to the register at "GW2166" as the sub-command.

The operation control module 202 writes the robot program name and the start portion of the robot program to a part of the registers from "GW2167" to "GW2499." The start portion of the robot program is information for identifying a program code with which the execution is to be started among a plurality of program codes corresponding to the robot program. When the robot program is created in a ladder language, the start portion of the robot program is a line number. When the robot program is to be started from the head of the robot program in place of some midpoint of the robot program, the start portion is not required to be written. When the operation control module 202 finishes the above-mentioned writing, the operation control module 202 increments the command request ID at "GW2163" in order to cause the robot controller 30 to select the robot program.

Thus, the processing for selecting the robot program is completed. When the operation control module 202 finishes the above-mentioned writing, the operation control module 202 transmits the transmission data corresponding to the registers at "GW2042" to "GW2499." The robot controller 30 receives the transmission data, and writes the transmission data to a storage 301 for communication described later. An execution module 302 of the robot controller 30 refers to the storage 301 for communication to determine whether or not the command request ID has been incremented. In this case, the command request ID is incremented, and hence the execution module 302 executes the main command and the sub-command, and reads out the robot program indicated by the robot program name included in the transmission data. When the start portion is specified, the execution module 302 reads out the robot program from the start portion. The robot program that has been read out is loaded into a data storage 300 or the storage 301 for communication.

The execution module 302 of the robot controller 30 transmits response data indicating a result of executing the main command and the sub-command to the higher-level control device 20. This response data has the same format as that shown at "0012" to "2041" of FIG. 9. For example, the execution module 302 transmits response data including: the command request ID, the main command, and the sub-command that correspond to the executed command; and a return value indicating that the command has been normally executed. When the command has not been normally executed, a return value to that effect is included in the response data.

When the operation control module 202 receives the response data, the operation control module 202 writes the response data to the register module 201. The operation control module 202 determines whether or not the command request ID, the main command, and the sub-command that are included in the transmission data match the command request ID, the main command, and the sub-command that are included in the response data. The operation control module 202 also determines whether or not the return value included in the response data indicates a normal value. The operation control module 202 advances to the subsequent processing when both the determination of the match and the determination of the normal value are affirmative. When at least one of the determination of the match or the determination of the normal value is negative, an error may be returned without advancing to the subsequent processing.

The operation control module 202 writes a value (for example, 1) indicating the robot controlling function to the register at "GW2165" as the main command. The operation control module 202 writes a value (for example, 5) indicating the robot program execution to the register at "GW2166" as the sub-command. The operation control module 202 increments the command request ID at "GW2163." In the case of the execution of the robot program, it is assumed that nothing is written to the registers at "GW2167" to "GW2499."

Thus, the processing for executing the robot program is completed. The operation control module 202 transmits transmission data corresponding to the registers from "GW2042" to "GW2499." In the same manner as in the above-mentioned flow, the execution module 302 of the robot controller 30 detects that the command request ID has been incremented, and executes the main command and the sub-command. The robot program has already been read by the previous main command and the previous sub-command, and hence the execution module 302 executes the robot program that has been read out. When the start portion of the robot program is specified, the execution module 302 executes the robot program from the specified start portion. When the robot program is executed, the response data is transmitted in the same manner as in the above-mentioned flow, and it is determined whether or not the robot program has been normally executed.

The control of the first robot controller 30 has been described above, but the second and subsequent robot controllers 30 are also controlled in the same manner. When the operation control module 202 is to control a given robot controller 30, the operation control module 202 may rewrite the variable in the register in the register range corresponding to the given robot controller 30 in the register module 201, to thereby control the given robot controller 30.

The control method of the robot controller 30 is not limited to the above-mentioned example. The operation control module 202 may control the robot controller 30 without using the main command and the sub-command. For example, the operation control module 202 may control a given robot controller 30 by writing one command to a register in the register range corresponding to the given robot controller 30. In another example, when a variable to be a condition for starting a device program of a given robot controller 30 is to be stored in a register in the register range corresponding to the given robot controller 30, the operation control module 202 may rewrite the value of the variable, to thereby instruct the given robot controller 30 to start execution of the device program.

In addition, consistency between a part or all of the variables stored in the register module 201 and a part or all of the variables stored in the storage 301 for communication may be regularly achieved. Further, the higher-level control device 20 and the robot controller 30 may be connected to each other by an asynchronous communication network, or may be connected to each other by a synchronous communication network. Further, for example, data may be regularly transmitted and received between the higher-level control device 20 and the robot controller 30.

3-3. Functions implemented by Robot Controller

As illustrated in FIG. 8, the robot controller 30 includes the data storage 300, the storage 301 for communication, and the execution module 302. The data storage 300 is mainly implemented by the storage 32. The storage 301 for communication and the execution module 302 are mainly implemented by the CPU 31.

Data Storage

The data storage 300 is configured to store the data required for the robot controller 30 to perform a predetermined operation. For example, the data storage 300 stores a device program and parameters. Further, for example, the data storage 300 stores a program of a robot program that is not included in the device program.

Storage Unit for Communication

The storage 301 for communication is configured to store each of the plurality of variables received from the higher-level control device 20. For example, the storage 301 for communication stores a variable included in the reception data received from the higher-level control device 20. This variable has the same value as that of the variable stored in the register module 201. The storage 301 for communication may store other variables. In this embodiment, a case in which the storage 301 for communication is implemented by registers in the CPU 31 is described, but the data storage 300 may store each of the plurality of variables without separately providing the data storage 300 and the storage 301 for communication. It is assumed that the register system of the storage 301 for communication is defined in advance. This register system is fixed in principle and cannot be changed, but the register system may be changeable by the engineering tool.

Execution Module

The execution module 302 is configured to execute predetermined processing based on the program stored in the data storage 300 and the variables stored in the storage 301 for communication. The flow of executing a command by the execution module 302 is as described above. That is, the execution module 302 determines whether or not the command request ID recorded in the storage 301 for communication has been incremented. When the execution module 302 determines that the command request ID has been incremented, the execution module 302 executes the processing based on a combination of the main command and the sub-command. It is assumed that a relationship between the combination of the main command and the sub-command and processing contents to be executed is defined in advance. This definition may be defined in the device program, or a definition file may be separately prepared and stored in the data storage 300. The execution module 302 may execute a given device program when the execution module 302 detects that the variable to be the condition for starting the given device program has become a predetermined value.

3-4. Functions implemented by Data Collection Device

As illustrated in FIG. 8, the data collection device 50 includes a data storage 500. The data storage 500 is mainly implemented by the storage 52. The data storage 500 stores the collected data storing the variables collected from the higher-level control device 20. The collected data is data storing the values of the variables specified as the collection targets. The collected data may store the value of a variable at a certain time point, or may store a chronological change of the value of the variable. In addition, the collected data may store only the value of one variable, or may store the values of a plurality of variables. In another example, the data storage 500 may store an analysis program for the collected data.

4. Processing to be Executed in Production System in Embodiment

Figure 11:
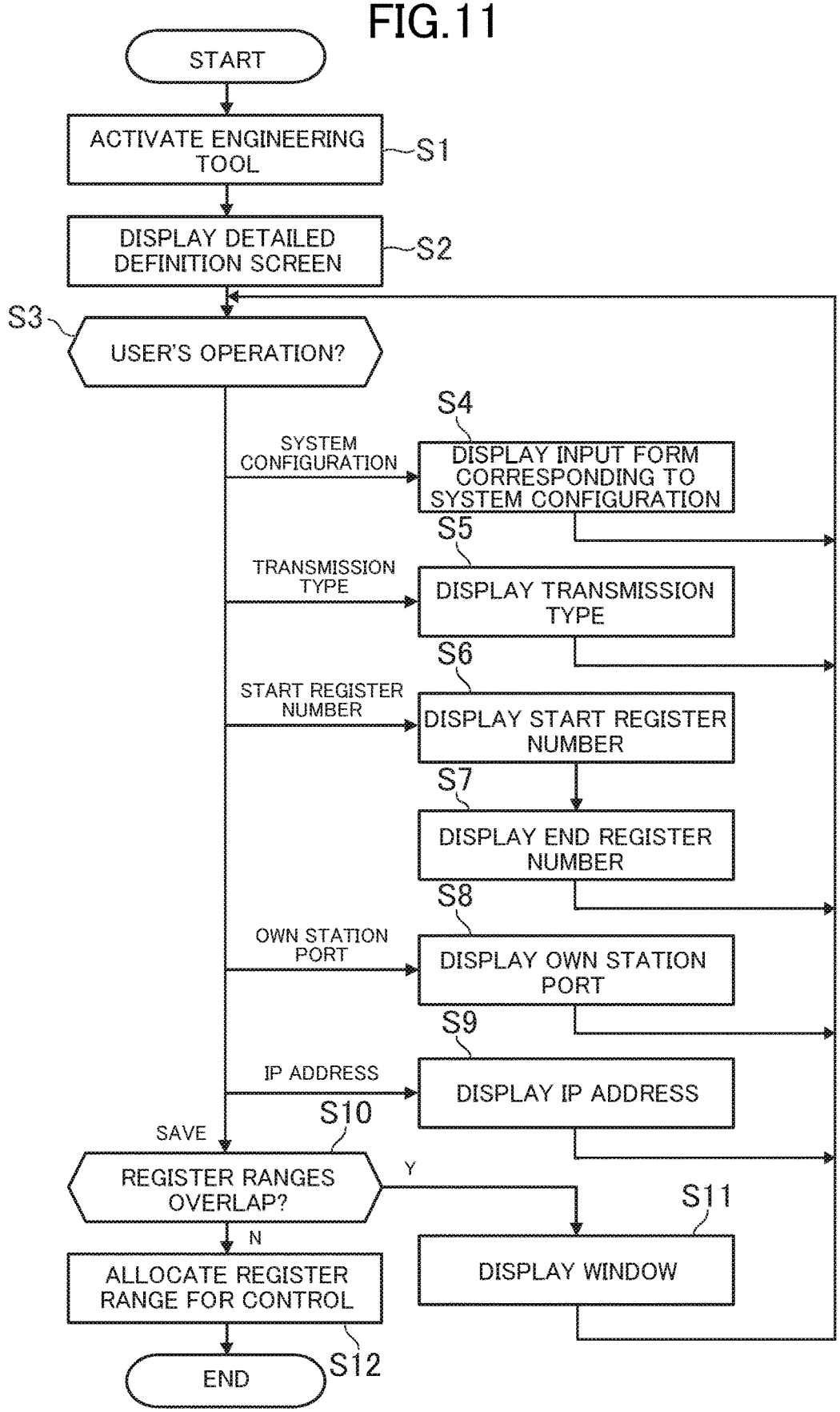
FIG. 11 is a flow chart for illustrating an example of processing to be executed in the production system in an embodiment of the present disclosure.

FIG. 11 is a flow chart for illustrating an example of processing to be executed in the production system 1 in the embodiment. In this embodiment, among processing procedures to be executed in the production system 1, processing for the user to perform the communication setting through use of the engineering tool is described. The processing illustrated in FIG. 11 is executed by the CPU 11 executing the engineering tool stored in the storage 12. The processing illustrated in FIG. 11 is an example of processing to be executed by the functional blocks illustrated in FIG. 8.

As illustrated in FIG. 11, the engineering device 10 activates the engineering tool (Step S1), and when a detailed definition is selected from a menu screen (not shown), the detailed definition screen G1 is displayed on the display 15 (Step S2). In this case, a case in which the user performs new communication setting is described. Accordingly, the detailed definition screen G1 displayed in Step S2 is in an initial state as shown in FIG. 2.

The engineering device 10 identifies the user's operation on the detailed definition screen G1 based on a detection signal of the operation interface 14 (Step S3). In this flow, there is described a case of performing an operation for specifying the system configuration, an operation for specifying the transmission type, an operation for specifying the start register number, an operation for specifying the own station port, an operation for specifying the IP address of the robot controller 30, or an operation for saving the detailed definition. When another operation, for example, an operation for inputting the comment, is performed, processing corresponding to the another operation may be executed.

When the operation for specifying the system configuration is performed ("SYSTEM CONFIGURATION" in Step S3), the engineering device 10 displays the window W10, and displays, on the detailed definition screen G1, the system configuration specified by the user and the input form F10 corresponding to the system configuration (Step S4). When the operation for specifying the transmission type is performed ("TRANSMISSION TYPE" in Step S3), the engineering device 10 displays the transmission type specified by the user on the detailed definition screen G1 (Step S5). Then, the engineering device 10 returns to the processing of Step S3.

When the operation for specifying the start register number is performed ("START REGISTER NUMBER" in Step S3), the engineering device 10 displays the start register number specified by the user on the detailed definition screen G1 (Step S6). The engineering device 10 displays the end register number on the detailed definition screen G1 based on the structure data D1 stored in the storage 12 (Step S7), and returns to the processing of Step S3. In Step S7, the engineering device 10 acquires, as the end register number, a value obtained by adding a value corresponding to the size shown in the structure data D1 to the start register number. The processing of Step S7 is processing for determining the register range.

When the operation for specifying the own station port is performed ("OWN STATION PORT" in Step S3), the engineering device 10 displays the own station port specified by the user on the detailed definition screen G1 (Step S8), and returns to the processing of Step S3. When the operation for specifying the IP address of the robot controller 30 is performed ("IP ADDRESS" in Step S3), the engineering device displays the IP address of the robot controller 30 specified by the user on the detailed definition screen G1 (Step S9), and returns to the processing of Step S3.

When the operation for saving the detailed definition is performed ("SAVE" in Step S3), the engineering device 10 determines whether or not the register ranges overlap with each other (Step S10). In Step S10, the engineering device determines, for each register range for the robot controller 30, whether or not the each register range overlaps with any one of the register range for another robot controller 30 and the register range for another purpose. It is assumed to be recorded in advance in the storage 12 which register range is allocated for what purpose.

When the engineering device 10 determines that the register ranges overlap with each other (Y in Step S10), the engineering device 10 displays the window W11 including the message (Step S11), and returns to the processing of Step S3. When the engineering device 10 does not determine that the register ranges overlap with each other (N in Step S10), the engineering device 10 allocates the specified register range of the higher-level control device 20 for the control of the robot controller 30 (Step S12), and this processing ends.

With the production system 1 described above, a freely-selected register range desired by the user among the registers of the higher-level control device 20 can be allocated for use for the control of the robot controller 30. When the registers of the higher-level control device 20 include a predetermined register range wished to be used for another purpose, it is possible to allow use of the predetermined register range for other purposes by specifying the register numbers so as to avoid the register range. It is possible to effectively utilize the registers by specifying the register numbers so as to prevent the registers of the higher-level control device 20 from being wasted. The effective utilization of the registers enables the registers used for the control of the robot controller 30 to be secured even when the higher-level control device 20 is small in memory capacity. Accordingly, the cost of the higher-level control device 20 can be reduced.

Further, the production system 1 enables the start register number to be specified in the register range to be allocated for the control of the robot controller 30, to thereby facilitate the specification of the register range, and hence the convenience of the user is improved.

Further, the production system 1 allocates the register range based on the register number specified by the user and the data structure defined in the communication profile between the robot controller 30 and the higher-level control device 20, to thereby be able to secure the register range for accurate communication between the robot controller 30 and the higher-level control device 20.

Further, the production system 1 outputs a predetermined alert when it is determined that the register range to be used for the control of the robot controller 30 and another register range to be used for another purpose overlap with each other, to thereby be able to prevent those register ranges from overlapping with each other. As a result, it is possible to prevent the operation of the higher-level control device 20 and the control of the robot controller 30 from being hindered.

Further, in the production system 1, even when the higher-level control device 20 controls a plurality of robot controllers 30, it is possible to allocate a freely-selected register range for controlling each of the plurality of robot controllers 30, to thereby improve the convenience of the user.

Further, the production system 1 allocates the register range including the register numbers for the command area, for the control of the robot controller 30, to thereby be able to store, in the command area, a command for calling and executing the program stored in the robot controller 30, and to call the program stored in the robot controller 30 from the higher-level control device 20.

Further, the production system 1 allocates the register range including the register numbers in the command area and the register numbers in the command request ID area, for the control of the robot controller 30, thereby being able to cause the robot controller 30 to execute the command at an accurate timing. For example, even when a command is stored in the command area despite a timing other than the timing to execute the command, it is possible to prevent the command from being executed unless information for requesting the execution of the command is stored in the command request ID area, to thereby be able to present the command from being erroneously executed.

Further, the production system 1 allocates a freely-selected register range among the registers of the higher-level control device 20 configured to control the robot controller 30, for the control of the robot controller 30 and at least one of the monitoring or the data collection.

5. Modification Examples

The present disclosure is not limited to the embodiment described above, and can be modified suitably without departing from the spirit of the present disclosure.

(1) For example, the function provided to the engineering tool is not limited to the register allocation function described in the embodiment. The engineering tool may have a function of creating a control program to be executed by the higher-level control device 20. In this modification example, there is described a function of supporting the creation of a control program by displaying the variable names included in the register range allocated for the control of a given robot controller 30.

Figure 12:
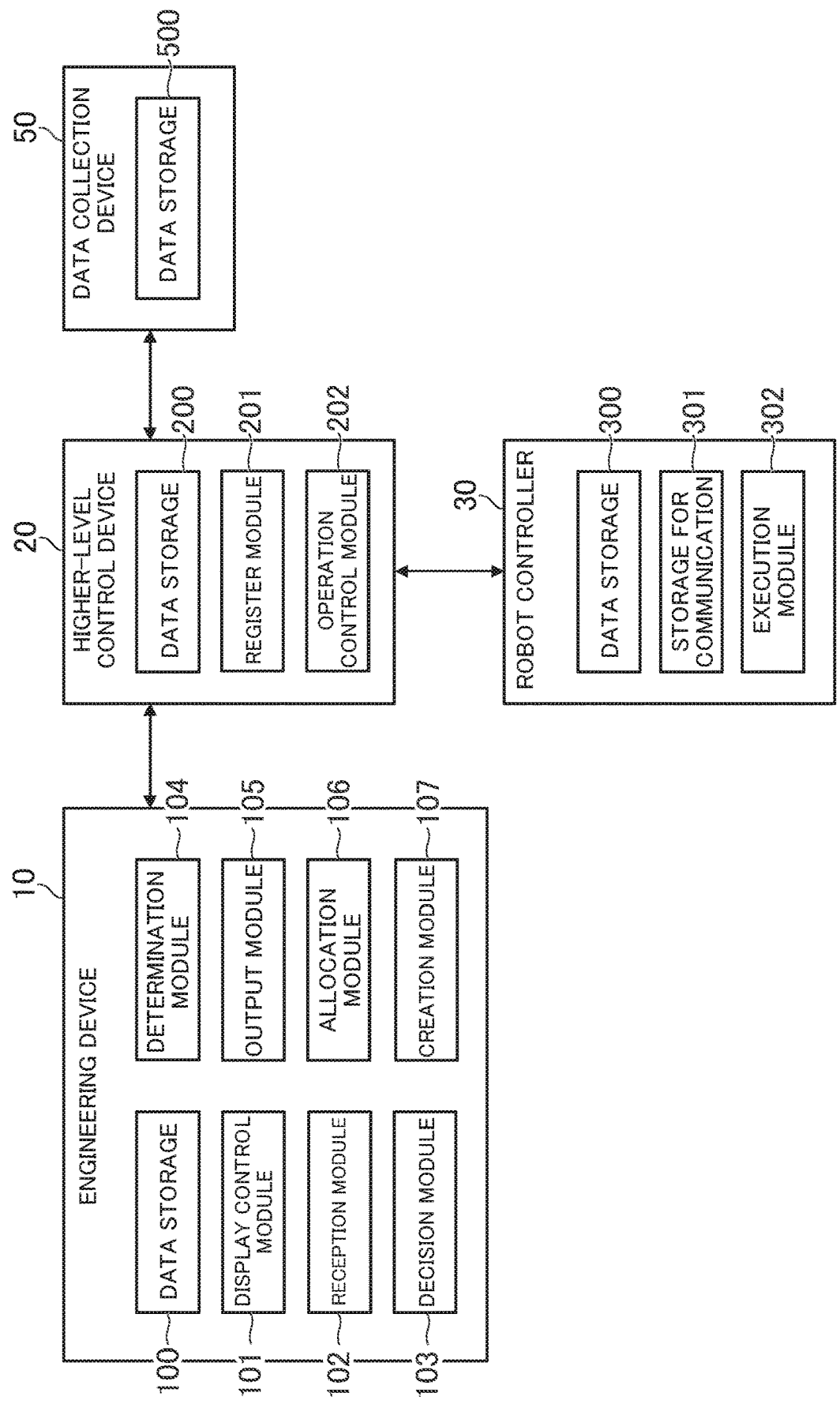
FIG. 12 is a functional block diagram in Modification Example (1) of the present disclosure.

FIG. 12 is a functional block diagram in Modification Example (1) of the present disclosure. As illustrated in FIG. 12, in Modification Example (1), in addition to the functions described in the embodiment, the creation module 107 is implemented in the engineering device 10. The creation module 107 is mainly implemented by the CPU 11.

The display control module 101 in this modification example displays a creation screen for a control program for enabling the higher-level control device 20 to control the robot controller 30. For example, when an icon for creating a control program is specified from the menu screen of the engineering tool, the display control module 101 displays the creation screen on the display 15.

Figure 13:
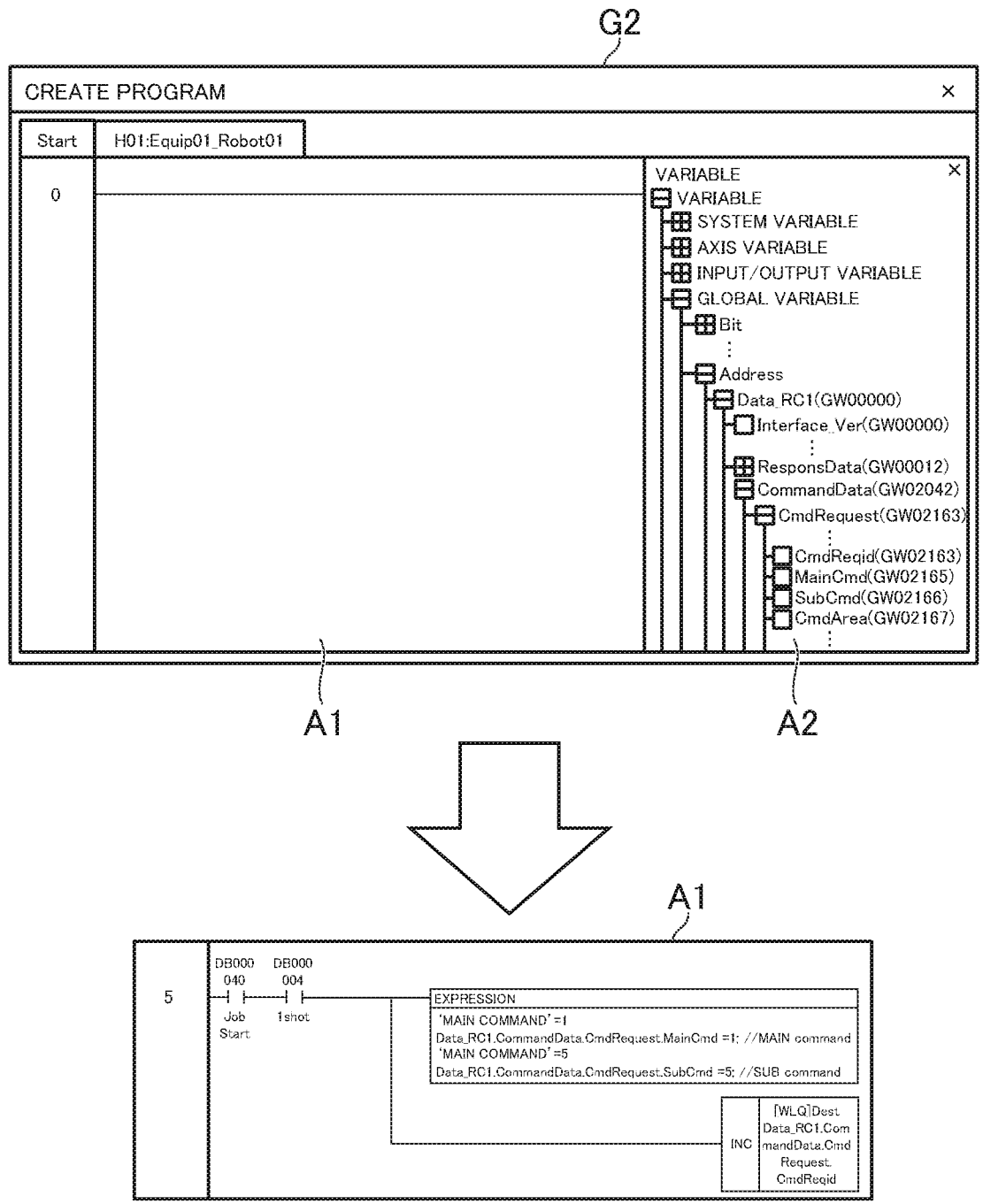
FIG. 13 is a diagram for illustrating an example of a creation screen.

FIG. 13 is a diagram for illustrating an example of the creation screen. In this modification example, the creation screen to be displayed when the user creates a control program through use of a ladder language is described as an example. As illustrated in FIG. 13, a creation screen G2 includes: a display area A1 for describing a ladder chart of a control program of a given robot controller 30; and a display area A2 for displaying the variables stored in the register range corresponding to the robot controller 30.

A basic operation with respect to the display area A1 may be the same as that of known software for supporting the creation of a program. The display control module 101 displays the ladder chart in the display area A1 based on the user's operation. In this modification example, while processing for the variable stored in the higher-level control device 20 is being described, the names of the variables can be specified from the display area A2.

As described with reference to FIG. 9, the variables have a hierarchical structure. For example, the display control module 101 displays the tier name of each variable in the display area A2 by a tree-type menu based on the structure data D1. In FIG. 13, the variable for the control of the robot controller 30 is indicated by a name of "Address." When the register ranges for three robot controllers 30 are allocated, the variable names included in the register ranges for the three robot controllers 30 are displayed under "Address" in a tree-like manner. In the display area A2, variables other than the variables for the control of the robot controller 30 are displayed as well.

In the example of FIG. 13, the character string "Data_RC1 (GW00000)" is displayed in the display area A2 as the name of the variable group for the first robot controller 30. In this modification example, a case in which the start register number is written together with the name of the variable group is described, but the start register number may be omitted. The name of the variable group may be stored in the structure data D1 or the detailed definition data D2, or may be stored in other data.

As illustrated in FIG. 13, when the tree of "Data_RC1 (GW00000)" is opened, the variables of the first robot controller 30 are displayed in a tree-like manner. For example, the name in the first tier is displayed immediately under "Data_RC1 (GW00000)." When the name of the first tier is opened, the name in the second tier corresponding to the first tier is displayed. In the same manner, the names in tiers down to a bottom tier (fourth tier in the example of FIG. 9) are displayed in a tree-like manner. The user can open the tree by specifying a freely-selected tier name.

For example, when the user opens the tree of "Command-Data" in the first tier, the character strings "SyncCounter" and "CmdRequest" and other character strings are displayed as the names in the second tier corresponding to this hierarchy. When the user opens the tree of "CmdRequest" in the second tier, "CmdReqid," "MainCmd," "SubCmd," and "CmdArea" are displayed as the names in the third tier corresponding to this hierarchy. As shown in FIG. 9, there is no fourth tier in this hierarchy. The third tier is the lowest tier in this hierarchy, and hence the names in the third tier correspond to the names of the variables.

Although not displayed in FIG. 13, when the display area A2 is scrolled down, the name "Data_RC2 (GW05000)" of the variable group for the second robot controller 30 and the name "Data_RC3 (GW10000)" of the variable group for the third robot controller 30 are displayed. In this case, a procedure for creating a control program corresponding to the first robot controller 30 is given as an example, but the control programs corresponding to the second and third robot controllers 30 can also be created by the same procedure.

Now, a procedure for creating a control program for causing the first robot controller 30 to execute the robot program is given as an example. As described in the embodiment, in order to cause the first robot controller 30 to execute the robot program, it is required to, in the register range corresponding to the first robot controller 30, write "1" to the main command at "GW02165," write "5" to the sub-command at "GW02166," and then increment the command request ID at "GW02163." In the display area A1, it is required to describe a ladder chart so as to indicate those processing steps.

For example, when the user specifies a predetermined line in the display area A1 and then specifies "MainCmd" displayed in the display area A2, the variable name of the main command corresponding to the first robot controller 30 is displayed in the specified line in the display area A1. In the example of FIG. 13, this variable name is a character string obtained by connecting "Data_RC1" in the zeroth tier, "CommandData" in the first tier, "CmdRequest" in the second tier, and "MainCmd" in the third tier to each other by dots. The user specifies that the main command indicated by this variable name is to be set to 1 with respect to the display area A1. This completes the description of the processing for writing "1" to the main command.

Further, for example, when the user specifies a predetermined line in the display area A1 and then specifies "Sub-Cmd" displayed in the display area A2, the variable name of the sub-command corresponding to the first robot controller 30 is displayed in the specified line in the display area A1. In the example of FIG. 13, this variable name is a character string obtained by connecting "Data_RC1" in the zeroth tier, "CommandData" in the first tier, "CmdRequest" in the second tier, and "SubCmd" in the third tier to each other by dots. The user specifies that the sub-command indicated by this variable name is to be set to 5 with respect to the display area A1. This completes the description of the processing for writing "5" to the sub-command.

Further, for example, when the user specifies a predetermined line in the display area A1 and then specifies "CmdReqid" displayed in the display area A2, the variable name of the command request ID corresponding to the first robot controller 30 is displayed in the specified line in the display area A1. In the example of FIG. 13, this variable name is a character string obtained by connecting "Data_RC1" in the zeroth tier, "CommandData" in the first tier, "CmdRequest" in the second tier, and "CmdReqid" in the third tier to each other by dots. The user specifies that the command request ID indicated by this variable name is to be incremented with respect to the display area A1. This completes the description of the processing for incrementing the command request ID.

With the above-mentioned procedure, the creation of a ladder chart for causing the first robot controller 30 to execute the robot program is completed. As illustrated in FIG. 13, the user also describes a coil for starting the execution of the control program. For example, the execution of the control program may be started by setting the variable associated with the control program to a predetermined value, or may be started by another method.

The creation module 107 creates a control program based on the operation on the creation screen G2. For example, the creation module 107 creates a control program based on the ladder chart described in the display area A1. As a method itself of creating a control program from a ladder chart, a known method can be employed. In addition, the creation module 107 may create a control program based on a method corresponding to a program language. For example, when the control program is created in a robot language, the creation module 107 may create a control program by a method corresponding to the robot language to be used by the user.

As described above, the display control module 101 in this modification example displays, on the creation screen G2, the variable names corresponding to the plurality of register numbers included in the allocated register range. In the example of FIG. 13, the name in the lowest tier corresponds to the variable name. In this modification example, the variable names corresponding to the plurality of register numbers included in the register range have a hierarchical structure, and the display control module 101 displays the variable names on the creation screen in a tree-like manner based on the hierarchical structure of the variable names. The display control module 101 is not required to display the variable names in a tree-like manner.

When a variable name displayed on the creation screen is specified, the creation module 107 creates the control program so as to control the register at the register number corresponding to the specified variable name. Controlling the register refers to at least one of referring to or rewriting the variable stored in the register. In the above-mentioned example, rewriting the value of each of the command request ID, the main command, and the sub-command corresponds to controlling the register.

According to Modification Example (1), the variable names corresponding to the plurality of register numbers included in the register range allocated for the control of the robot controller 30 are displayed on the creation screen G2 for a control program, to thereby allow the user to create a control program while grasping the variable names, and hence it is possible to improve the convenience of the user at the time of creating a control program.

Further, a control program is created so as to control the register at the register number specified from the creation screen G2, to thereby be able to create a control program by a simpler operation, and hence it is possible to improve the convenience of the user.

Further, the variable names having a hierarchical structure are displayed in a tree-like manner, to thereby be able to achieve a more intuitive user interface.

(2) Further, for example, when the higher-level control device 20 includes a plurality of types of registers, the reception module 102 may receive the specification of any one of register numbers of the plurality of types of registers. In this modification example, there is described a case in which the higher-level control device 20 includes a first register configured to hold data when power is turned off and a second register configured to avoid holding data when power is turned off. For example, the first register is a volatile memory or a memory that does not support battery backup. Meanwhile, for example, the second register is a nonvolatile memory or a memory that supports battery backup.

For example, the reception module 102 receives the specification of the first register or the second register on the detailed definition screen G1. The register may be specified by a freely-selected operation. For example, the name of the register may be displayed in a manner that the name of the register can be specified on the detailed definition screen G1, or the register may be specified based on a character string input by the user. The reception module 102 receives the specification of the register and the specification of the register number. For example, the character "GW" in the start register number may mean the type of the register. In this case, the specification of the register and the specification of the register number are collectively received.

The decision module 103 in this modification example determines the register range of registers of a type corresponding to the register number based on the specified register number. The processing of the decision module 103 is different from that of the embodiment in that the register range of registers specified by the user is targeted among the plurality of registers of the higher-level control device 20, and the method itself of determining the register range is as described in the embodiment.

For example, when the user specifies the first register and the register number, the decision module 103 determines, as the register range for the control of the robot controller 30, the register range corresponding to the register number specified by the user among the first registers. Meanwhile, for example, when the user specifies the second register and the register number, the decision module 103 determines, as the register range for the control of the robot controller 30, the register range corresponding to the register number specified by the user among the second registers.

The allocation module 106 allocates the determined register range of registers of the type corresponding to the specified register number among the plurality of types of registers, for the control of the robot controller 30. The processing of the allocation module 106 is different from that of the embodiment in that the register range of registers specified by the user is targeted among the plurality of registers of the higher-level control device 20, and the method itself of allocating the register range is as described in the embodiment. In this modification example, the information for identifying the register is written to the higher-level control device 20. The higher-level control device 20 identifies the register and the register range that correspond to a given robot controller 30 based on the information for identifying the register and the register range.

For example, when the user specifies the first register and the register number, the allocation module 106 allocates, as the register range for the control of the robot controller 30, the register range corresponding to the register number specified by the user among the first registers. Meanwhile, for example, when the user specifies the second register and the register number, the allocation module 106 allocates, as the register range for the control of the robot controller 30, the register range corresponding to the register number specified by the user among the second registers.

According to Modification Example (2), even when the higher-level control device 20 includes a plurality of types of registers, a freely-selected register range of freely-selected registers can be allocated, and hence it is possible to improve the convenience of the user.

(3) Further, for example, the above-mentioned modification examples may be combined.

Further, for example, each of the functions described above may be implemented by any device included in the production system 1. For example, the function described as being implemented by the data collection device 50 may be implemented by the higher-level control device 20 or the robot controller 30. Further, for example, the function described as being implemented by the higher-level control device 20 may be implemented by the data collection device 50 or the robot controller 30. Further, for example, each of the functions may be implemented by one computer instead of being shared by a plurality of computers.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications.

What is claimed is:

1. An engineering device, which is configured to set a higher-level control device capable of controlling a control device for one or more industrial machines, the engineering device comprising circuitry configured to:
   receive specification of a start register number of the higher-level control device from a user;
   acquire a structure data that indicate a structure defined in a communication profile between the control device and the higher-level control device, the structure data including (1) an offset that is a register number based on the start register number, and (2) a plurality of tiers that are information indicating an attribute of a variable stored in a register corresponding to the offset,
   determine, as an end register number, a number obtained by adding a size defined in the offset of the structure data to the specified start register number,
   determine a range from the start register number to the end register number as a register range to be used for control of the control device by the higher-level control device; and
   allocate the determined register range among registers of the higher-level control device, for the control of the control device, the variable that is defined in the plurality of tiers of the structure data being stored in the allocated resister range.

2. The engineering device according to claim 1, wherein the circuitry is configured to:
   determine whether the determined register range and another register range to be used for another purpose overlap with each other; and
   output a predetermined alert when it is determined that the determined register range and the another register range overlap with each other.

3. The engineering device according to claim 1,
   wherein the higher-level control device is configured to control each of a plurality of control devices,
   wherein the circuitry is configured to:
      receive the specification of the start register number for each of the plurality of control devices,
      determine, for each of the plurality of control devices, the register range to be used for the control of the each of the plurality of control devices by the higher-level control device based on the start register number specified for the each of the plurality of control devices, and
      allocate, for each of the plurality of control devices, the register range determined for the each of the plurality of control devices for the control of the each of the plurality of control devices.

4. The engineering device according to claim 1,
   wherein the control device is configured to store a program for performing a predetermined operation,
   wherein the register range includes a register number for a command area for storing a command for calling the program of the control device and causing the control device to execute the program, and
   wherein the circuitry is configured to allocate, for the control of the control device, the register range including the register number for the command area.

5. The engineering device according to claim 1,
   wherein the register range includes: a register number for a command area for storing a command directed to the control device; and a register number for a command request information area for storing command request information for requesting execution of a command stored in the command area, and
   wherein the circuitry is configured to allocate, for the control of the control device, the register range including the register number for the command area and the register number for the command request information area.

6. The engineering device according to claim 1,
   wherein the register range is used for at least one of monitoring or data collection relating to an operation of the control device in addition to the control of the control device, and
   wherein the circuitry is configured to allocate the determined register range for the control of the control device and at least one of the monitoring or the data collection.

7. The engineering device according to claim 1, wherein the circuitry is configured to:
   display a creation screen for a control program for enabling the higher-level control device to control the control device;
   create the control program based on an operation on the creation screen, and
   display, on the creation screen, variable names corresponding to a plurality of register numbers, respectively, included in the allocated register range.

8. The engineering device according to claim 7, wherein the circuitry is configured to create, when a variable name displayed on the creation screen is specified, the control program so as to control the register at the register number corresponding to the specified variable name.

9. The engineering device according to claim 7,
   wherein the variable names corresponding to the plurality of register numbers included in the register range have a hierarchical structure, and
   wherein the circuitry is configured to display the variable names on the creation screen in a tree-like manner based on the hierarchical structure of the variable names.

10. The engineering device according to claim 1,
    wherein the higher-level control device includes a plurality of types of registers,
    wherein the circuitry is configured to:
       receive specification of any one of register numbers of the plurality of types of registers,
       determine, based on the specified register number, the register range of registers of a type corresponding to the specified register number, and
       allocate, for the control of the control device, the determined register range of the registers of the type corresponding to the specified register number among the plurality of types of registers.

11. The engineering device according to claim 2,
wherein the higher-level control device is configured to control each of a plurality of control devices,
wherein the circuitry is configured to:
receive the specification of the start register number for each of the plurality of control devices,
determine, for each of the plurality of control devices, the register range to be used for the control of the each of the plurality of control devices by the higher-level control device based on the start register number specified for the each of the plurality of control devices, and
allocate, for each of the plurality of control devices, the register range determined for the each of the plurality of control devices for the control of the each of the plurality of control devices.

12. The engineering device according to claim 1, wherein the structure data includes (3) a name that is a name of the variable stored in the register corresponding to the offset, the variable that is defined in the name of the structure data being stored in the allocated resistor range.

13. The engineering device according to claim 1,
wherein the attribute is a class of the variable;
wherein the plurality of tiers are organized by specificity and the lower tier is represented as having a more specific class.

14. An engineering method for setting a higher-level control device capable of controlling a control device for one or more industrial machines, the engineering method comprising:
receiving specification of a start register number of the higher-level control device from a user;
acquiring a structure data that indicate a structure defined in a communication profile between the control device and the higher-level control device, the structure data including (1) an offset that is a register number based on the start register number, and (2) a plurality of tiers that are information indicating an attribute of a variable stored in a register corresponding to the offset,
determining, as an end register number, a number obtained by adding a size defined in the offset of the structure data to the specified start register number and,
determining a range from the start register number to the end register number as a register range to be used for control of the control device by the higher-level control device; and
allocating the determined register range among registers of the higher-level control device, for the control of the control device, the variable that is defined in the plurality of tiers of the structure data being stored in the allocated resister range.

15. A non-transitory computer readable information storage medium storing a program for causing an engineering device, which is configured to set a higher-level control device capable of controlling a control device for one or more industrial machines, to:
receive specification of a start register number of the higher-level control device from a user;
acquire a structure data that indicate a structure defined in a communication profile between the control device and the higher-level control device, the structure data including (1) an offset that is a register number based on the start register number, and (2) a plurality of tiers that are information indicating an attribute of a variable stored in a register corresponding to the offset,
determine, as an end register number, a number obtained by adding a size defined in the offset of the structure data to the start specified register number,
determine a range from the start register number to the end register number as a register range to be used for control of the control device by the higher-level control device; and
allocate the determined register range among registers of the higher-level control device, for the control of the control device, the variable that is defined in the of tiers of the structure data being stored in the allocated resister range.

* * * * *